United States Patent
Tsutsumi et al.

(10) Patent No.: US 9,180,876 B2
(45) Date of Patent: Nov. 10, 2015

(54) CONTROL APPARATUS FOR HYBRID VEHICLE

(71) Applicant: Toyota Jidosha Kabushiki Kaisha, Toyota-shi, Aichi (JP)

(72) Inventors: Takahiko Tsutsumi, Toyota (JP); Toshio Sugimura, Toyota (JP); Seiji Kuwahara, Toyota (JP); Shun Sato, Toyota (JP); Koki Minamikawa, Toyota (JP)

(73) Assignee: TOYOTA JIDOSHA KABUSHIKI KAISHA (JP)

( * ) Notice: Subject to any disclaimer, the term of this patent is extended or adjusted under 35 U.S.C. 154(b) by 11 days.

(21) Appl. No.: 14/172,062

(22) Filed: Feb. 4, 2014

(65) Prior Publication Data

US 2014/0222269 A1 Aug. 7, 2014

Related U.S. Application Data

(60) Provisional application No. 61/761,095, filed on Feb. 5, 2013.

(51) Int. Cl.
*B60W 20/00* (2006.01)
*B60W 10/02* (2006.01)
*B60W 10/08* (2006.01)
*B60W 10/06* (2006.01)

(52) U.S. Cl.
CPC ............... *B60W 20/40* (2013.01); *B60W 10/02* (2013.01); *B60W 10/06* (2013.01); *B60W 10/08* (2013.01); *Y02T 10/6221* (2013.01); *Y02T 10/6286* (2013.01); *Y10S 903/93* (2013.01)

(58) Field of Classification Search
CPC ..... B60W 20/40; B60W 20/10; B60W 20/30; B60W 30/184–30/1843; B60W 30/186; B60W 30/19–30/194; B60W 2510/0291; B60W 2510/10; B60W 2710/029; B60W 2710/10; B60W 2710/1005; B60W 10/02; B60W 10/08; B60W 10/06; B60W 10/11; B60W 6/20–6/26; B60W 2006/262–2006/268; B60W 6/38–6/387; Y01T 10/62; Y01T 10/6213; Y01T 10/6221; Y01T 10/6226; Y01T 10/6286; Y10S 903/93; Y10S 903/902; Y10S 903/904–903/906; Y10S 903/90; Y10S 903/912; Y10S 903/917; Y10S 903/919
See application file for complete search history.

(56) References Cited

U.S. PATENT DOCUMENTS

| | | | | |
|---|---|---|---|---|
| 6,887,180 B2 * | 5/2005 | Pels et al. | ........................... | 477/3 |
| 7,708,095 B2 * | 5/2010 | Hirata | ...................... | 180/65.275 |
| 7,881,834 B2 * | 2/2011 | Le Neindre et al. | ............ | 701/22 |

(Continued)

FOREIGN PATENT DOCUMENTS

JP 2007069789 A 3/2007

*Primary Examiner* — Bao Long T Nguyen
(74) *Attorney, Agent, or Firm* — Dinsmore & Shohl LLP

(57) ABSTRACT

Embodiments described herein relate to control apparatuses for hybrid vehicles which permit starting the engine and a shift-down action of the transmission while assuring not only a reduction of the heat generated by a clutch, but also an improvement in the response of the vehicle to an operator's desire for high drivability. In one embodiment, the control apparatus controls the hybrid vehicle such that when the transmission is required to be shifted down while the hybrid vehicle is switched from a motor drive mode to an engine drive mode, a time of initiation of the shift-down action of the transmission is delayed by a longer length of time when a temperature of the clutch upon initiation of an engine starting control to start the engine is relatively high than when the temperature is relatively low. Various other embodiments of control apparatuses for hybrid vehicles are also described.

5 Claims, 8 Drawing Sheets

(56) References Cited

U.S. PATENT DOCUMENTS 8,116,957 B2 * 2/2012 Oh et al. .......................... 701/67
8,202,199 B2 * 6/2012 Katakura et al. ............. 477/171
2003/0054920 A1 * 3/2003 Berger et al. ................... 477/70
2007/0056783 A1 3/2007 Joe et al.
2011/0237388 A1 * 9/2011 Koenig et al. ..................... 477/5
2012/0264565 A1 * 10/2012 Kobayashi ........................ 477/5

* cited by examiner

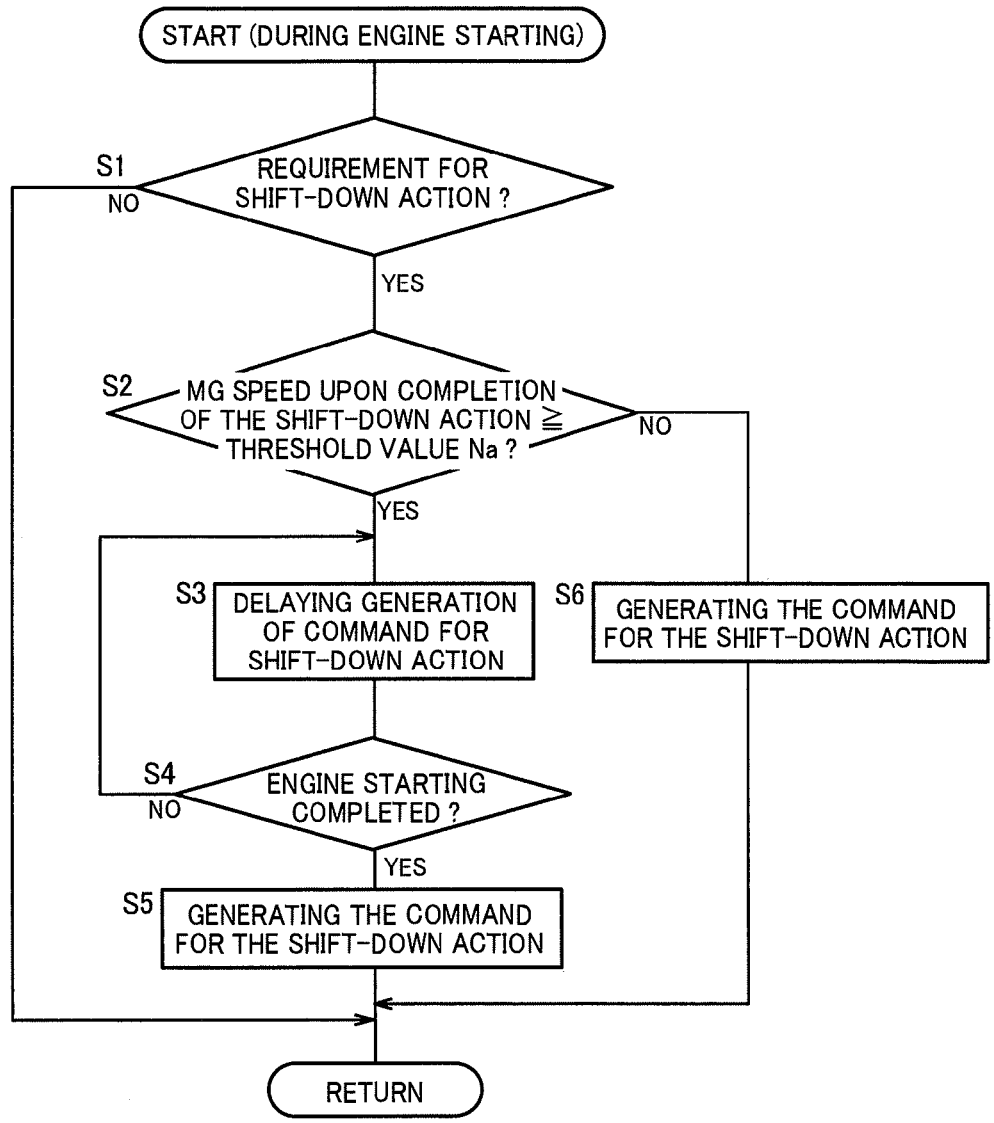

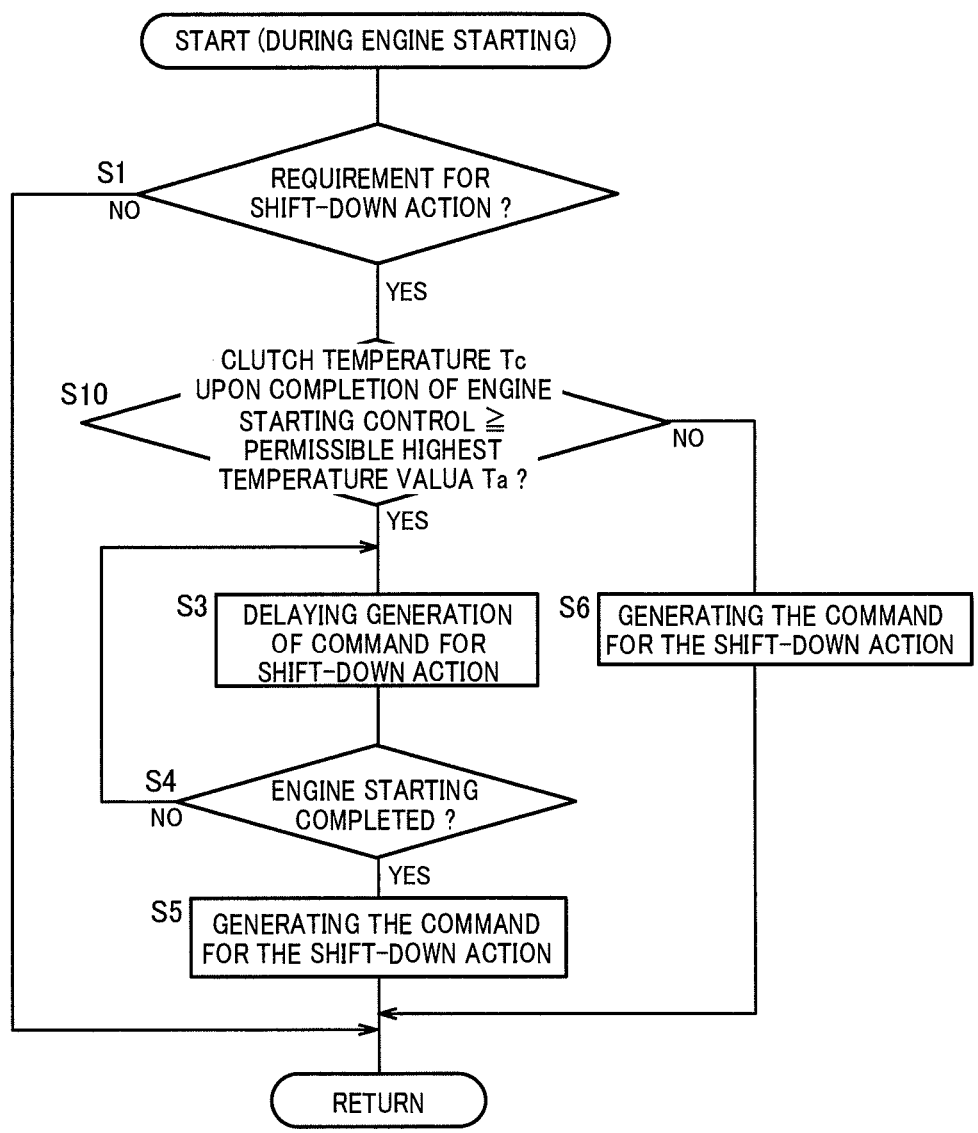

CONTROL APPARATUS FOR HYBRID VEHICLE

CROSS REFERENCE TO RELATED APPLICATIONS

The present specification claims priority to U.S. Provisional Patent Application Ser. No. 61/761,095 filed Feb. 5, 2013 and entitled "CONTROL DEVICE FOR HYBRID VEHICLE," the entirety of which is incorporated by reference herein.

TECHNICAL FIELD

The present specification relates to control apparatuses for hybrid vehicles, and more particularly to controls for switching a drive mode of the hybrid vehicle from a motor drive mode to an engine drive mode.

BACKGROUND

Hybrid vehicles may include an engine, an electric motor, a clutch for placing a power transmitting path between the engine and the electric motor in a power transmitting state and a power cutoff state, and a transmission disposed in a power transmitting path between the electric motor and drive wheels. Patent Document 1 discloses an example of such a hybrid vehicle. When this hybrid vehicle is placed in a motor drive mode in which the electric motor is operated as the vehicle drive power source, the clutch is placed in a released state to prevent a dragging state of the engine. When the hybrid vehicle is placed in an engine drive mode in which the engine is the main vehicle drive power source, on the other hand, the clutch is placed in an engaged state to transmit a drive force of the engine to the drive wheels. Patent Document 1 also describes that the vehicle drive mode is switched from the motor drive mode to the engine drive mode, by placing the clutch in a slipping state to increase a speed of the engine with a torque of the electric motor, to a value at which the engine can be operated by itself, for thereby starting the engine. Patent Document 1 further describes that when the transmission is instructed to be shifted down as a result of an operation of an accelerator pedal during start of the engine, that is, when a so-called "power-on shift-down action" of the transmission is required, the transmission is shifted down after the engine is started. This manner of control reduces a slipping speed of the clutch during an increase in the engine speed, and accordingly reduces the generation of heat by the slipping clutch, making it possible to reduce deterioration of the clutch due to the generated heat.

PRIOR ART DOCUMENT

Patent Document

Patent Document 1: JP-2007-69789 A

SUMMARY

The hybrid vehicle disclosed in Patent Document 1 is configured to shift down the transmission only after the completion of a start of the engine when the power-on shift-down action is required during the start of the engine. In some instances, an operator of the hybrid vehicle may desire rapid acceleration of the hybrid vehicle, namely, a high degree of responsiveness to the vehicle operator's desire for high drivability of the hybrid vehicle. However, the shift-down action performed only after starting the engine means a delay of the shift-down action, and a low degree of responsiveness to the vehicle operator's requirement for the power-on shift-down action for high drivability of the hybrid vehicle. While this problem can be solved by performing the shift-down action concurrently with the starting of the vehicle, this solution gives rise to another problem of an increase of the amount of heat generated by the clutch. Thus, the conventional hybrid vehicle configured to reduce the amount of heat generated by the clutch does not improve the responsiveness of the hybrid vehicle to the vehicle operator's desire for high drivability of the hybrid vehicle.

The embodiments of control apparatuses and systems described herein were made in view of the background described above, and provide a control apparatus for a hybrid vehicle which includes an engine, an electric motor, a clutch for placing a power transmitting path between the engine and the electric motor in a power transmitting state and a power cutoff state, and a transmission disposed in a power transmitting path between the electric motor and drive wheels, and which permits starting of the engine and a shift-down action of the transmission, while assuring not only a reduction of an amount of heat generated by the clutch, but also an improvement of the responsiveness of the hybrid vehicle to a vehicle operator's desire for high drivability of the vehicle.

A first aspect of the present specification provides a control apparatus for (a) a hybrid vehicle provided with an engine, an electric motor, a clutch for placing a power transmitting path between the engine and the electric motor in a power transmitting state and a power cutoff state, and a transmission disposed in a power transmitting path between the electric motor and drive wheels, (b) the hybrid vehicle being switchable between a motor drive mode in which the hybrid vehicle is driven with the electric motor being used as the vehicle drive power source while the clutch is placed in a released state, and an engine drive mode in which the hybrid vehicle is driven with the engine as the main vehicle drive power source while the clutch is placed in an engaged state, (c) an operating speed of the engine being increased by the electric motor in a slipping state of the clutch when the hybrid vehicle is switched from the motor drive mode to the engine drive mode, and (d) the control apparatus being characterized by controlling the hybrid vehicle such that when the transmission is required to be shifted down while the hybrid vehicle is required to be switched from the motor drive mode to the engine drive mode, a time of initiation of a shift-down action of the transmission is delayed by a longer length of time when a temperature of the clutch upon initiation of an engine starting control to start the engine is relatively high than when the temperature is relatively low.

The control apparatus according to the first aspect is configured such that when the hybrid vehicle is required to be switched from the motor drive mode to the engine drive mode while the transmission is required to be shifted down, the length of time by which the initiation of the shift-down action of the transmission is delayed increases with an increase of the temperature of the clutch upon initiation of the engine starting control. Accordingly, when the engine speed is relatively low, it is possible to complete the engine starting control with the clutch placed in the fully engaged state, so that the amount of slipping of the clutch during the engine starting control is reduced, whereby the deterioration of the clutch due to the generated heat can be prevented. Further, the shift-down action is initiated with a relatively short delay time when the clutch temperature upon initiation of the engine starting control is relatively low, so that the response of the hybrid vehicle to the operator's desire for high vehicle drivability is improved.

A second aspect of the present specification provides a control apparatus for (a) a hybrid vehicle provided with an engine, an electric motor, a clutch for placing a power transmitting path between the engine and the electric motor in a power transmitting state and a power cutoff state, and a transmission disposed in a power transmitting path between the electric motor and drive wheels, (b) the hybrid vehicle being switchable between a motor drive mode in which the hybrid vehicle is driven with the electric motor being used as the vehicle drive power source while the clutch is placed in a released state, and an engine drive mode in which the hybrid vehicle is driven with the engine being used as the main vehicle drive power source while the clutch is placed in an engaged state, (c) an operating speed of the engine being increased by the electric motor in a slipping state of the clutch when the hybrid vehicle is switched from the motor drive mode to the engine drive mode, and (d) the control apparatus being characterized by controlling the hybrid vehicle such that when the transmission is required to be shifted down while the hybrid vehicle is required to be switched from the motor drive mode to the engine drive mode, an engaging torque of the clutch is relatively large when a temperature of the clutch upon initiation of an engine starting control to start the engine is relatively high than when the temperature is relatively low. According to this second aspect, the engaging torque of the clutch increases with an increase of the temperature of the clutch upon initiation of the engine starting control, so that the rate of rise of the engine speed increases with the increase of the clutch temperature. Accordingly, it is possible to complete the engine starting control with the clutch placed in the engaged state, when the engine speed is relatively low, so that the amount of slipping of the clutch during the engine starting control is reduced, whereby the deterioration of the clutch due to the generated heat is prevented. Further, the engaging torque of the clutch is relatively small when the clutch temperature is relatively low, so that an engaging shock of the clutch during the engine starting control is reduced, and the response of the hybrid vehicle to the operator's desire for high vehicle drivability is improved.

A third aspect of the present specification provides a control apparatus for (a) a hybrid vehicle provided with an engine, an electric motor, a clutch for placing a power transmitting path between the engine and the electric motor in a power transmitting state and a power cutoff state, and a transmission disposed in a power transmitting path between the electric motor and drive wheels, (b) the hybrid vehicle being switchable between a motor drive mode in which the hybrid vehicle is driven with the electric motor being used as the vehicle drive power source while the clutch is placed in a released state, and an engine drive mode in which the hybrid vehicle is driven with the engine being used as the main vehicle drive power source while the clutch is placed in an engaged state, (c) an operating speed of the engine being increased by the electric motor in a slipping state of the clutch when the hybrid vehicle is switched from the motor drive mode to the engine drive mode, (d) the control apparatus controlling the hybrid vehicle in a selected one of a first control mode in which an engine starting control to start the engine upon switching of the hybrid vehicle from the motor drive mode to the engine drive mode is implemented concurrently with a shift-down control to shift down the transmission, and a second control mode in which the shift-down control is implemented after completion of the engine starting control, and (e) the control apparatus being more likely to select the second control mode rather than the first control mode, to switch the hybrid vehicle from the motor drive mode to the engine drive mode, when a temperature of the clutch upon initiation of the engine starting control is relatively high than when the temperature is relatively low. According to this third aspect of the present specification, the second control mode in which the amount of heat generated by the slipping action of the clutch is reduced is more likely to be selected when the temperature of the clutch is relatively high, so that the deterioration of the clutch due to the generated heat is prevented. When the clutch temperature is relatively low, on the other hand, the first control mode is more likely to be selected, so that the response of the vehicle to the operator's desire for high drivability of the vehicle is improved. In the first control mode, the amount of heat generated by the clutch is relatively large, but the clutch temperature which is relatively low will not exceed its permissible highest temperature. Thus, the control mode is switched between the first control mode and the second control mode according to the clutch temperature, permitting not only the prevention of deterioration of the clutch due to the generated heat, but also the improvement of the vehicle response to the operator's desire for high vehicle drivability.

According to one embodiment, the control apparatus is more likely to select the second control mode than the first control mode when an input speed of the transmission to be established upon completion of the shift-down action is relatively high. The amount of heat generated by the slipping action of the clutch during the start of the engine increases with an increase of the input speed of the transmission to be established upon completion of the shift-down action. Accordingly, the amount of heat generated by the clutch is further effectively reduced by selecting the second control mode when the input speed is relatively high, so that the deterioration of the clutch due to the generated heat is prevented.

According to another embodiment, the second control mode is selected when the input speed of the transmission to be established upon completion of the shift-down action is equal to or greater than a predetermined threshold value, and the first control mode is selected when the input speed is less than the predetermined threshold value. In this embodiment, one of the first control mode and the second control mode is selected according to the calculated input speed to be established upon completion of the shift-down action. The second control mode is more likely to be selected when the input speed is relatively high, since the input speed is likely to exceed the threshold value.

According to a further embodiment, the predetermined threshold value is set so as to decrease with an increase of the temperature of the clutch upon initiation of the engine starting control. Accordingly, the second control mode is more likely to be selected when the clutch temperature is relatively high, since the threshold value decreases with the increase of the clutch temperature.

According to a still further embodiment, a temperature of the clutch is calculated on the basis of a temperature of a working oil. Accordingly, the temperature of the clutch can be detected without the provision of a sensor for detecting the clutch temperature.

According to a yet further embodiment, the transmission is a step-variable automatic transmission. The step-variable transmission is required to be shifted down while the engine is started, when an accelerator pedal is depressed in the motor drive mode, and one of the first control mode and the second control mode is suitably selected, so as to permit not only the prevention of deterioration of the clutch due to the generated heat but also the improvement of the response of the hybrid vehicle to the operator's desire for high vehicle drivability.

In the first control mode, the engine starting control and the shift-down control of the transmission are concurrently implemented, so that the response of the vehicle to the operator's desire for high vehicle drivability is improved. However, a target value to which the engine speed is increased by the slipping action of the clutch during the engine starting control is the input speed of the transmission upon completion of the shift-down action, so that an amount of change of the engine speed is relatively large, resulting in a relatively large amount of heat generated by the clutch.

In the second control mode, the shift-down action of the transmission is initiated after completion of the engine starting control, namely, the shift-down action is delayed, so that the response of the vehicle to the operator's desire for high vehicle drivability is reduced. However, the target value to which the engine speed is increased by the slipping action of the clutch during the engine starting control is the input speed of the transmission prior to initiation of the shift-down action, so that an amount of change of the engine speed is relatively small, whereby the amount of generation of heat by the clutch is reduced.

According to a still further embodiment, the temperature of the clutch is calculated on the basis of a temperature of a working oil for operating the transmission. In this embodiment, the provision of a sensor for detecting the clutch temperature is not necessary, and fewer parts are required for controlling the vehicle.

According to a yet further embodiment, the vehicle is driven in the engine drive mode with an assisting drive force generated by the electric motor, in addition to a drive force of the engine.

BRIEF DESCRIPTION OF THE DRAWINGS

FIG. 7 is a flow chart of a major control operation of the electronic control device according to an embodiment described herein and, more specifically, a flow chart of a control operation to implement the engine starting control and the shift-down control of the automatic transmission;

FIG. 8 is a table indicating the increase in the clutch temperature corresponding to respective different combinations of the shift-down action of the automatic transmission and vehicle running speed;

FIG. 9 is a flow chart of a major control operation of an electronic control device according to another embodiment described herein and, more specifically, flow chart of a control operation to implement the engine starting control and the shift-down control of the automatic transmission;

DETAILED DESCRIPTION

Embodiments of the control apparatuses and systems will be described in detail by reference to the drawings. In the embodiments described below, the drawings are simplified or otherwise modified to assist in describing various embodiments, and may not necessarily accurately represent the dimensions and shapes of various elements of the embodiments.

First Embodiment

Figure 1:
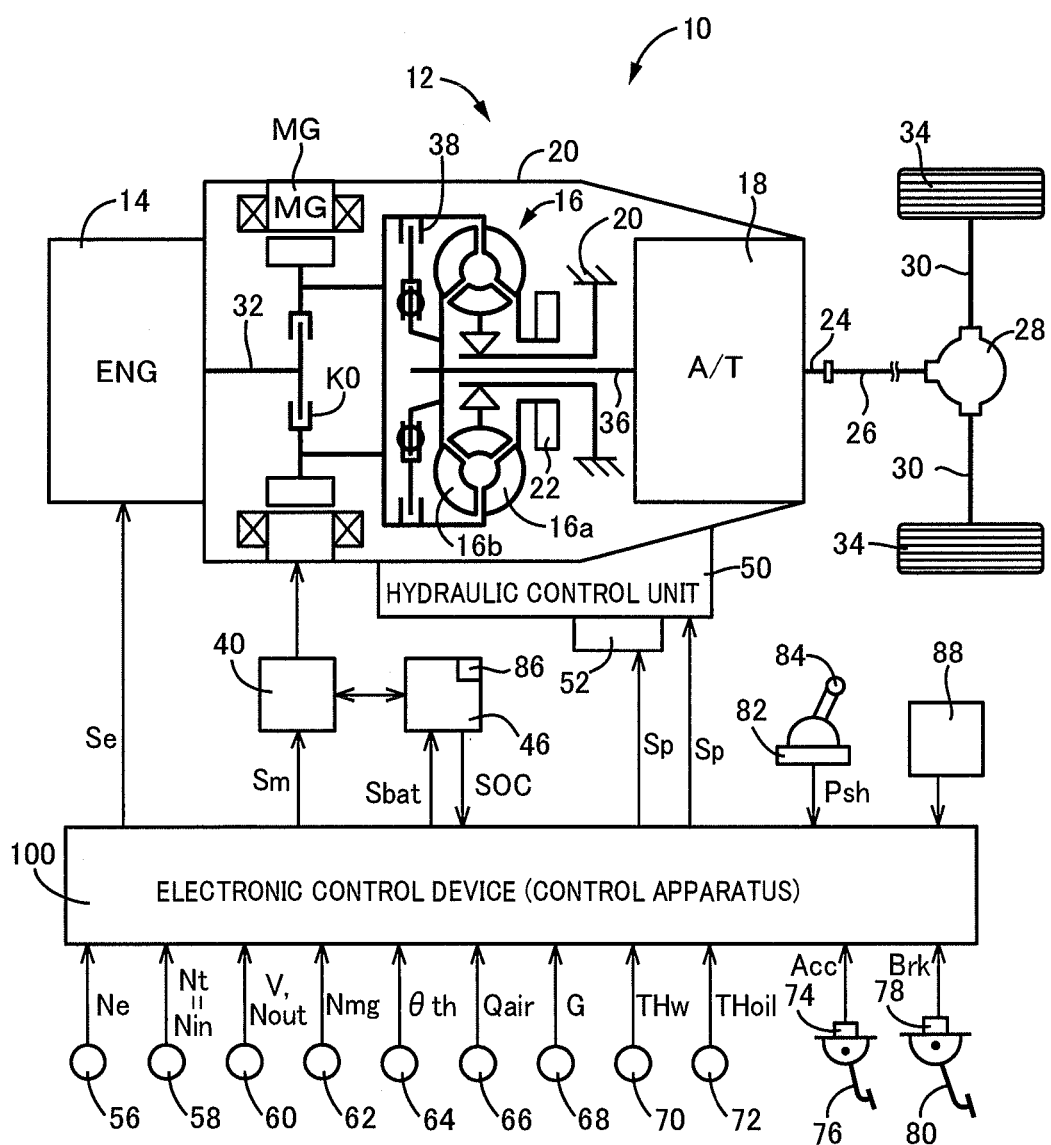
FIG. 1 is a schematic view showing an arrangement of a power transmitting path from an engine and an electric motor to drive wheels of a hybrid vehicle to which the control apparatuses and systems described herein are suitably applicable, and major portions of a control system provided on the hybrid vehicle for implementing an output control of the engine functioning as the vehicle drive power source, a shifting control of the automatic transmission, a driving control of the electric motor, etc.

FIG. 1 schematically depicts an arrangement of a power transmitting path from an engine 14 and an electric motor MG to the drive wheels 34 of a hybrid vehicle 10 (hereinafter referred to as "vehicle 10") to which the embodiments described herein are suitably applicable. FIG. 1 also depicts major portions of a control system provided on the vehicle 10 for implementing an output control of the engine 14 functioning as the vehicle drive power source, a shifting control of an automatic transmission 18, a driving control of the electric motor MG, etc.

As shown in FIG. 1, a vehicular power transmitting system 12 (hereinafter referred to as "power transmitting system 12") is provided with an engine connecting/disconnecting clutch K0, the electric motor MG, a torque converter 16, an oil pump 22, and the automatic transmission 18, which are disposed within a transmission casing 20 as a non-rotatable member (hereinafter referred to as "casing 20"), in the order of description from the side of the engine 14. The casing 20 is bolted or otherwise attached to a body of the vehicle. The power transmitting system 12 is provided with: a propeller shaft 26 connected to an output shaft 24 which is an output rotary member of the automatic transmission 18; a differential gear device 28 connected to the propeller shaft 26; and a pair of axles 30 connected to the differential gear device 28. The power transmitting system 12 constructed as described above is suitably used for an FR-type vehicle (Front-engine Rear drive). In the power transmitting system 12, a drive force of the engine 14 is transmitted from an engine connecting shaft 32 connecting the engine 14 and the engine connecting/disconnecting clutch K0 to each other, to a pair of drive wheels 34 through the engine connecting/disconnecting clutch K0, torque converter 16, automatic transmission 18, propeller shaft 26, differential gear device 28 and pair of axles 30, in this order of description, when the engine connecting/disconnecting clutch K0 is placed in its engaged state.

The torque converter 16 is a fluid-operated power transmitting device constructed to transmit a drive force received by a pump impeller 16a, to the automatic transmission 18 through a fluid. The pump impeller 16a is connected to the engine 14 through the engine connecting/disconnecting clutch K0 and the engine connecting shaft 32 in this order of description, and is an input rotary element which receives the drive force from the engine 14 and is rotatable about its axis. The torque converter 16 has a turbine impeller 16b as its output rotary element, which is splined or otherwise connected to a transmission input shaft 36 such that the turbine impeller 16b is not rotatable relative to the transmission input shaft 36, which is an input member of the automatic transmission 18. The torque converter 16 is provided with a lock-up clutch 38, which is a clutch disposed between the pump impeller 16a and the turbine impeller 16b, for directly connecting these impellers 16a, 16b to each other. The lock-up clutch 38 is hydraulically controlled, for example, and may be placed in one of an engaged state, a slipping state and a released state.

The electric motor MG is a so-called "motor/generator" which functions as a motor operable to convert electric energy into a mechanical drive force, and as an electric generator operable to convert mechanical energy into electric energy. In other words, the electric motor MG can function as a vehicle drive power source which generates a vehicle drive force, in place of, or in addition to the engine 14 which may also provide a vehicle drive power source. The electric motor MG is driven with the drive force generated by the engine 14, or with a force (mechanical energy) received from the drive wheels 34, to perform a regenerative operation for generating electric energy which is stored in an electric energy storage device in the form of a battery 46, through an inverter 40 and a booster converter (not shown). The electric motor MG is operatively connected to the pump impeller 16a such that a drive force is transmitted between the electric motor MG and the pump impeller 16a. Thus, like the engine 14, the electric motor MG is operatively connected to the transmission input shaft 36. The electric motor MG is connected to the battery 46 through the inverter 40 and the booster converter (not shown) so that the electric motor MG supplies and receives electric energy to and from the battery 46. When the electric motor MG is used as the vehicle drive power source, the engine connecting/disconnecting clutch K0 is placed in the released state, and the drive force of the electric motor MG is transmitted to the pair of drive wheels 34 through the torque converter 16, automatic transmission 18, propeller shaft 26, differential gear device 28 and pair of axles 30, in this order of description.

The oil pump 22 is a mechanically operated oil pump connected to the pump impeller 16a and driven by the engine 14 (or the electric motor MG), to deliver a pressurized oil for shifting the automatic transmission 18, for controlling a torque capacity of the lock-up clutch 38, for placing the engine connecting/disconnecting clutch K0 in its engaged or released state, and for lubricating various portions of the power transmitting paths of the vehicle 10. The power transmitting system 12 is also provided with an electrically operated oil pump 52 operated by an electric motor (not shown), as an auxiliary oil pump, to generate hydraulic pressure while the oil pump 22 is at rest, for instance, while the vehicle is stationary.

The engine connecting/disconnecting clutch K0 is a hydraulically operated frictional coupling device of a wet multiple-disc type having a plurality of friction plates which are superposed on each other and forced against each other by a hydraulic actuator, for example. The engine connecting/disconnecting clutch K0 is selectively placed in the engaged and released states with the hydraulic pressure generated by the oil pump 22 or the electrically operated oil pump 52, under the control of a hydraulic control unit 50 provided in the power transmitting system 12. When the engine connecting/disconnecting clutch K0 is brought into the engaged or released state, a torque capacity of the clutch K0, that is, an engaging force of the clutch K0 is continuously changed with hydraulic pressure regulation by linear solenoid valves incorporated within the hydraulic control unit 50, for example. The engine connecting/disconnecting clutch K0 has a pair of rotary members (a clutch hub and a clutch drum) which are rotatable relative to each other when the clutch K0 is placed in the released state. One of these rotary members, namely, the clutch hub, is connected to the engine connecting shaft 32 such that the clutch hub is rotated with the engine connecting shaft 32, while the other of the rotary members, namely, the clutch drum, is connected to the pump impeller 16a of the torque converter 16 such that the clutch drum is rotated with the pump impeller 16a. When the thus constructed engine connecting/disconnecting clutch K0 is placed in the engaged state, the pump impeller 16a is rotated with the engine 14 via the engine connecting shaft 32. That is, the drive force of the engine 14 is transmitted to the pump impeller 16a in the engaged state of the engine connecting/disconnecting clutch K0. When the engine connecting/disconnecting clutch K0 is placed in the released state, on the other hand, the pump impeller 16a is disconnected from the engine 14. Since the electric motor MG is operatively connected to the pump impeller 16a as described above, the engine connecting/disconnecting clutch K0 also functions as a clutch for placing a power transmitting path between the engine 14 and the electric motor MG, in a power transmitting state and a power cutoff state. In the present embodiment, the engine connecting/disconnecting clutch K0 is a so-called "normally open type" clutch in which the torque capacity (engaging force) of the clutch increases with an increase of the hydraulic pressure, and which is brought into its released state when the hydraulic pressure is not applied thereto.

The automatic transmission 18 is operatively connected to the electric motor MG, without the engine connecting/disconnecting clutch K0 being interposed therebetween, and constitutes a part of a power transmitting path between the engine 14 and the drive wheels 34, and a part of a power transmitting path between the electric motor MG and the drive wheels 34, so that the automatic transmission 18 functions to transmit the drive forces of the vehicle drive power sources (i.e., the engine 14 and the electric motor MG) to the drive wheels 34. The automatic transmission 18 is a planetary gear type multiple-step transmission functioning as a step-variable automatic transmission having a plurality of shift positions (gear positions) which are selectively established by engaging and releasing actions of respective combinations of hydraulically operated frictional coupling devices such as clutches and brakes. That is, the automatic transmission 18 is a conventional step-variable transmission which is configured to perform so-called "clutch-to-clutch shifting" actions, for changing, in steps, the ratio of a rotating speed of the output shaft 24 with respect to a rotating speed of the transmission input shaft 36. The transmission input shaft 36 is a turbine shaft rotated by the turbine impeller 16b of the torque converter 16. The automatic transmission 18 is shifted to a selected one of the gear positions (shift positions) with the engaging and releasing actions of the clutches and brakes, according to an amount of operation of an accelerator pedal by the vehicle operator and a running speed V of the vehicle. When all of the clutches and brakes are placed in the released state, the automatic transmission 18 is placed in its neutral state in which the power transmitting paths between the engine 14 and electric motor MG and the drive wheels 34 are placed in the power cutoff state. It is noted that the automatic transmission 18 is a transmission provided in a hybrid vehicle.

Referring back to FIG. 1, the vehicle 10 is provided with an electronic control device 100 including various control portions such as a hybrid drive control portion. In the embodiments described herein, the electronic control device 100 may include a processor and a memory storing a computer readable and executable instruction set which, when executed by the processor, controls the various functions of the hybrid vehicle, including, without limitation, the hybrid drive control portion. For instance, the electronic control device 100 includes a so-called microcomputer incorporating a CPU, a RAM, a ROM and an input-output interface. The CPU performs signal processing operations according to programs stored in the ROM, while utilizing a temporary data storage function of the RAM, to implement various controls of the vehicle 10. For example, the electronic control device 100 is configured to implement an output control of the engine 14, a regenerative control and other drive controls of the electric motor MG, a shifting control of the automatic transmission 18, a torque capacity control of the lock-up clutch 38, and a torque capacity control of the engine connecting/disconnecting clutch K0. The electronic control device 100 is constituted by a plurality of control units, as needed, such as an engine control unit, an electric motor control unit and a hydraulic control unit (a shifting control unit).

The electronic control device 100 receives various input signals such as: an output signal of an engine speed sensor 56 indicative of an operating speed Ne of the engine 14; an output signal of a turbine speed sensor 58 indicative of a rotating speed Nt of the turbine impeller 16b of the torque converter 16, which is an input speed of the automatic transmission 18, namely, a rotating speed Nin of the transmission input shaft 36; an output signal of an output shaft speed sensor 60 indicative of a rotating speed Nout of the output shaft 24 which is a vehicle-speed related value and which corresponds to the vehicle running speed V and the rotating speed of the propeller shaft 26; an output signal of an electric motor speed sensor 62 indicative of an operating speed Nmg of the electric motor MG; an output signal of a throttle sensor 64 indicative of an opening angle θth of an electronic throttle valve (not shown); an output signal of an intake air quantity sensor 66 indicative of an intake air quantity Qair of the engine 14; an output signal of an acceleration sensor 68 indicative of a longitudinal acceleration value G (or longitudinal deceleration value G) of the vehicle 10; an output signal of a cooling water temperature sensor 70 indicative of a cooling water temperature THw of the engine 14; an output signal of an oil temperature sensor 72 indicative of a temperature THoil of a working oil in the hydraulic control unit 50; an output signal of an accelerator opening angle sensor 74 indicative of an operation amount Acc of an accelerator pedal 76, which is a drive force of the vehicle 10 required by the vehicle operator (an operator required vehicle output); an output signal of a foot brake sensor 78 indicative of an operation amount Brk of a brake pedal 80, which is a braking force of the vehicle 10 required by the vehicle operator (an operator required vehicle deceleration value); an output signal of a shift position sensor 82 indicative of a shift position (operating position) Psh of a shift lever 84, which is a selected one of a plurality of known shift lever positions "P", "N", "D", "R" and "S"; and an output signal of a battery sensor 86 indicative of a stored electric energy amount (charged or residual energy amount) SOC of the battery 46. The electronic control device 100 is supplied with electric energy by an auxiliary battery 88, through a DC-DC converter (not shown) provided to lower the voltage of the electric energy.

The electronic control device 100 generates various signals such as: engine output control command signals Se to control the output of the engine 14; an electric motor control command signal Sm for controlling the operation of the electric motor MG; and hydraulic control command signals Sp for controlling solenoid valves incorporated in the hydraulic control unit 50 to control the hydraulic actuators of the engine connecting/disconnecting clutch K0 and the clutches and brakes of the automatic transmission 18, and for controlling the electrically operated oil pump 52.

Figure 2:
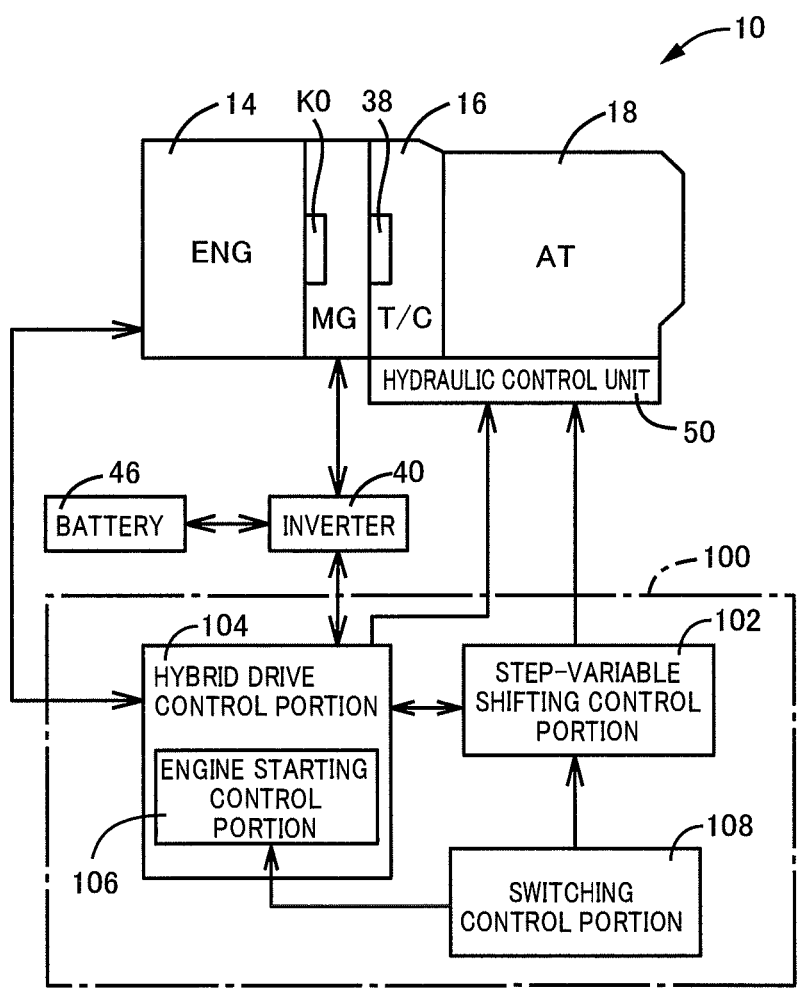
FIG. 2 is a functional block diagram of an electronic control device shown in FIG. 1.

FIG. 2 is a functional block diagram of the electronic control device 100. Step-variable shifting control means in the form of a step-variable shifting control portion 102 controls the shifting actions of the automatic transmission 18. The step-variable shifting control portion 102 is configured to determine whether a shifting action of the automatic transmission 18 should be performed, that is, to determine the shift position to which the automatic transmission 18 should be shifted. This determination is made on the basis of the vehicle running condition as represented by the actually detected vehicle running speed V and accelerator pedal operation amount Acc (or transmission output torque Tout), for example, and according to a known predetermined relationship (shifting map) stored in a memory as shift-up and shift-down lines determined in relation to the vehicle running speed V and accelerator pedal operation amount Acc used as variables. The step-variable shifting control portion 102 implements an automatic shifting control of the automatic transmission 18 to establish the determined shift position. The step-variable shifting control portion 102 determines that a shift-down action of the automatic transmission 18 is required, if the accelerator pedal operation amount Acc (i.e., the required vehicle drive torque) has exceeded a value represented by any one of the shift-down lines as a result of an increase of the operation amount Acc of the accelerator pedal 76. In this case, the step-variable shifting control portion 102 implements a shift-down control to command the automatic transmission 18 to perform a shift-down action corresponding to the above-indicated one of the shift-down lines. That is, the step-variable shifting control portion 102 supplies the hydraulic control unit 50 with the hydraulic control command signals (shift output command signals, hydraulic command signals) Sp for engaging and releasing the coupling devices selected to achieve a shift position according to a predetermined and stored table of operating states of the coupling devices in relation to the shift positions of the automatic transmission 18, for example. The hydraulic control unit 50 controls the linear solenoid valves incorporated therein, according to the received hydraulic control command signals Sp, to operate the hydraulic actuators of the selected coupling devices so that the coupling devices are engaged and released to shift the automatic transmission 18 to the determined shift position.

Hybrid drive control means in the form of a hybrid drive control portion 104 functions as an engine drive control portion for controlling the operation of the engine 14 and as an electric motor control portion for controlling the operation of the electric motor MG as a vehicle drive power source or as an electric generator, through the inverter 40. The hybrid drive control portion 104 performs those functions to implement hybrid drive controls of the engine 14 and the electric motor MG. For example, the hybrid drive control portion 104 calculates the required vehicle drive torque on the basis of the accelerator pedal operation amount Acc and the vehicle running speed V, and controls the vehicle drive power sources (engine 14 and electric motor MG) so as to generate a total output torque corresponding to the calculated required vehicle drive torque, while taking into account a power transmitting loss, a load acting on each accessory device in operation, the presently established shift position of the automatic transmission 18, the stored electric energy amount SOC of the battery 46, etc.

Described more specifically, when the calculated required vehicle drive torque can be obtained by only an output torque Tmg of the electric motor MG (electric motor torque Tmg), for instance, the hybrid drive control portion 104 selects a motor drive mode (hereinafter referred to as "EV drive mode") in which only the electric motor MG is operated as the vehicle drive power source. When at least an output torque Te of the engine 14 (engine torque) is needed to obtain the calculated required vehicle drive torque, on the other hand, the hybrid drive control portion 104 selects an engine drive mode in which at least the engine 14 is operated as the vehicle drive power source. Thus, the hybrid drive control portion 104 selects the EV drive mode or the engine drive mode as the vehicle drive mode.

To establish the EV drive mode, the hybrid drive control portion 104 commands the engine connecting/disconnecting clutch K0 to be placed in the released state, placing the power transmitting path between the engine 14 and the torque converter 16 in the power cutoff state. In the EV drive mode, the hybrid drive control portion 104 controls the electric motor MG to generate the electric motor torque Tmg required for running the vehicle in the EV drive mode. To establish the engine drive mode, on the other hand, the hybrid drive control portion 104 commands the engine connecting/disconnecting clutch K0 to be placed in the engaged state, transmitting the drive force of the engine 14 to the pump impeller 16a. In the engine drive mode, the hybrid drive control portion 104 controls the electric motor MG to generate an assisting vehicle drive torque, as needed. While the oil pump 22 is at rest in a stationary state of the vehicle, for example, the hybrid drive control portion 104 operates the electrically operated oil pump 52 as the auxiliary oil pump, to generate the required hydraulic pressure.

The hybrid drive control portion 104 also functions as a regenerative control during coasting of the vehicle in the non-operated state of the accelerator pedal or during braking of the vehicle by operation of the brake pedal 80. Namely, the hybrid drive control portion 104 controls the electric motor MG to be operated as the electric generator using the kinetic energy of the running vehicle 10, that is, with a reverse drive force transmitted from the drive wheels 34 toward the engine 14, converting the kinetic energy into an electric energy to be stored in the battery 46 through the inverter 40, in order to improve the fuel economy of the vehicle. The amount of regeneration of the electric energy by the electric motor MG under the control of the hybrid drive control portion 104 is determined according to the stored electric energy amount SOC of the battery 46, and a portion of the total braking force corresponding to the brake pedal operation amount, which portion is assigned to a hydraulically operated braking system.

The hybrid drive control portion 104 is functionally provided with an engine starting control portion 106 (engine starting control means) for starting the engine 14 to switch the vehicle drive mode from the EV drive mode to the engine drive mode, if the required vehicle drive torque is increased as a result of an increase of the operation amount of the accelerator pedal 76 in the EV drive mode, to a value that is higher than a maximum value of the electric motor torque Tmg that can be obtained in the EV drive mode. For starting the engine 14, the engine starting control portion 106 places the engine connecting/disconnecting clutch K0 in the slipping state and gradually brings the clutch K0 into the fully engaged state so that an engine starting torque Tmgs for starting the engine is transmitted from the electric motor MG to the engine through the clutch K0 in the slipping state to start the engine 14, to increase the engine speed Ne to a value corresponding to the electric motor speed Nmg, while at the same time the engine starting control portion 106 implements an engine ignition control and a fuel supply control, thereby starting the engine 14. After the engine 14 has been started, the hybrid drive control portion 104 rapidly brings the engine connecting/disconnecting clutch K0 into the fully engaged state in which the engine speed Ne and the electric motor speed Nmg become equal to each other.

By the way, the point indicative of the vehicle running condition may move across any shift-down line in the direction requiring a shift-down action of the automatic transmission 18 during an engine starting control by the engine starting control portion 106. Namely, a shift-down action of the automatic transmission 18 may be required during the engine starting control. Where the engine starting control and the control for the shift-down action of the automatic transmission 18 are required concurrently, the shift-down action is delayed in conventional control systems such that the shift-down action is performed after completion of the engine starting control. In this manner of control, the engine starting control is implemented while a difference between the engine speed Ne and the electric motor speed Nmg is small, so that the amount of heat generated by the engine connecting/disconnecting clutch K0 due to its slipping action during the engine starting control is reduced, whereby it is possible to reduce deterioration of the engine connecting/disconnecting clutch K0 due to the generated heat. However, the shift-down action performed only after completion of the engine starting control means a delay of the shift-down action, and a low degree of responsiveness of the vehicle to a vehicle operator's requirement for the shift-down action for high drivability of the vehicle, resulting in the vehicle operator's dissatisfaction with the delayed shift-down action although the acceleration request of the operator is relatively large.

In view of the problem indicated above, the electronic control device 100 is provided with two control means for controlling the shift-down action of the automatic transmission 18 required to be performed during switching of the vehicle drive mode from the motor drive mode to the engine drive mode, that is, during the engine starting control. These two control means are operated in respective first and second control modes. In the first control mode, the engine starting control and the shift-down control of the automatic transmission 18 are concurrently implemented. In the second control mode, the shift-down control to shift down the automatic transmission 18 is implemented after completion of the engine starting control. These first and second control modes are selectively operated on the basis of the conditions described below, to assure not only reduction of deterioration of the engine connecting/disconnecting clutch K0 due to the generated heat, but also an improvement of the responsiveness of the hybrid vehicle to a vehicle operator's desire for high drivability of the vehicle. The first and second control modes will be described in detail. In the first and second control modes described below, the lock-up clutch 38 is placed in the engaged state in which the electric motor speed Nmg is equal to the input speed Nin of the input shaft 36 of the automatic transmission 18.

To begin with, the first control mode will be described. In this first control mode, the engine starting control portion 106 and the step-variable shifting control portion 102 concurrently implement the engine starting control and the shift-down control of the automatic transmission 18, respectively. In this case, the shift-down action of the automatic transmission 18 is not delayed, as in the conventional control described above, so that the response of the vehicle to the vehicle operator's desire for high drivability of the vehicle is improved. Described in further detail with respect to the first control mode, the engine speed Ne is increased in the progress of the slipping action of the engine connecting/disconnecting clutch K0, so as to follow an increase of the electric motor speed Nmg, which is also increased in the progress of the shift-down action. Therefore, the engine speed Ne is increased during the slipping action of the engine connecting/disconnecting clutch K0, eventually to a value of the electric motor speed Nmg to be established upon completion of the shift-down action, when the clutch K0 has been brought into its fully engaged state. In this case, the amount of increase of the engine speed Ne in the engine starting control to a target value (equal to the value of the electric motor speed Nmg to be established upon completion of the shift-down action) is accordingly large, whereby a comparatively large amount of heat is generated by the clutch K0. It is noted that the first control mode requires the engine starting control and the shift-down control of the automatic transmission 18 to be implemented such that the periods of time of these two controls at least partially overlap each other, and does not require that the two controls are initiated at completely the same point of time and terminated at completely the same point of time. That is, the points of time of initiation and/or termination of the engine starting control and the shift-down control may be different from each other in the first control mode.

The second control mode will now be described. In the second control mode, the step-variable shifting control portion 102 implements the shift-down control to shift down the automatic transmission 18 after completion of the engine starting control by the engine starting control portion 106. In this case, the shift-down action of the automatic transmission 18 is delayed, so that the response of the vehicle to the vehicle operator's desire for high drivability of the vehicle is lowered. In the engine starting control in the second control mode, the engine speed Ne is increased to a value of the electric motor speed Nmg prior to initiation of the shift-down action, which is less than that to be established upon completion of the shift-down action. Accordingly, the amount of increase of the engine speed Ne to a target value (equal to the value of the electric motor speed Nmg prior to initiation of the shift-down action) is comparatively small, whereby an accordingly small amount of heat is generated by the clutch K0 during slipping of the clutch. Further, the comparatively low slipping speed of the clutch K0 permits the engine speed Ne to be rapidly increased to the electric motor speed Nmg, making it possible to shorten the length of time required for the engine starting control. After completion of the engine starting control, the engine connecting/disconnecting clutch K0 is brought into its fully engaged state, and the shift-down action is performed when the engine speed Ne and the electric motor speed Nmg are equal to each other.

Figure 3:
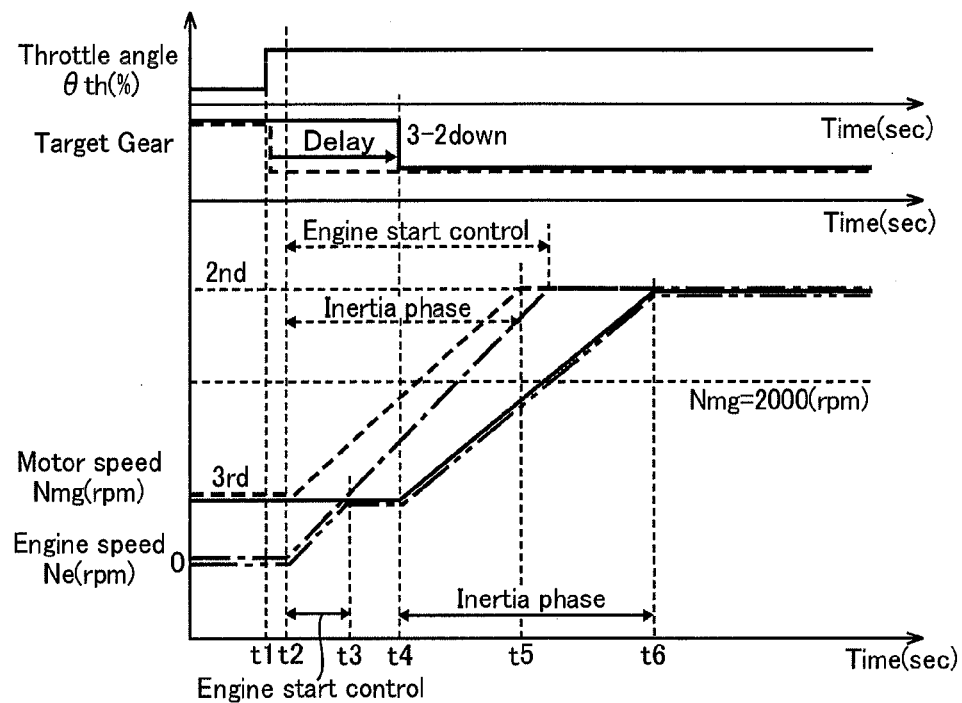
FIG. 3 graphically depicts control operations in a first control mode and a second control mode for implementing an engine starting control and a shift-down control to shift down the automatic transmission from a third-gear position to a second-gear position.

FIG. 3 graphically depicts a time chart of the control operations in the first control mode and the second control mode for implementing the engine starting control and the shift-down control to shift down the automatic transmission 18 from a third-gear position to a second-gear position. In FIG. 3, a broken line and a one-dot chain line respectively represent the electric motor speed (motor speed) Nmg and the engine speed Ne in the first control mode, while a solid line and a two-dot chain line respectively represent the electric motor speed Nmg and the engine speed Ne in the second control mode.

At a time t1 indicated in FIG. 3, the accelerator pedal 76 is operated to increase the opening angle θth of the throttle valve (throttle angle θth), so that the engine is required to be started, and the automatic transmission 18 is required to be shifted down from the third-gear position to the second-gear position. At a time t2, the control operation is initiated.

In the first control mode, the engine starting control and the shift-down control of the automatic transmission 18 are concurrently initiated at the time t2. Namely, the engaging action of the engine connecting/disconnecting clutch K0 is initiated at the time t2, so that an increase of the engine speed Ne is initiated as indicated by the one-dot chain line. At a time substantially coincident with the time t2, the shift-down control of the automatic transmission 18 is initiated, and an increase of the speed Nmg of the electric motor connected to the input shaft 36 of the automatic transmission 18 is initiated as indicated by the broken line. After the time t2, the engine speed Ne is increased in the progress of the engaging action to slip the engine connecting/disconnecting clutch K0, so as to follow an increase of the electric motor speed Nmg which is increased in the progress of the shift-down action. At a time t5, the electric motor speed Nmg reaches a target value to be established upon completion of the shift-down action of the automatic transmission 18 to the second-gear position. At a time shortly after the time t5, the engine speed Ne is increased to the above-indicated target value. In the first control mode in which the engine speed Ne is increased under the control of the slipping action of the engine connecting/disconnecting clutch K0, from zero to the target value to be established upon completion of the shift-down action, a difference between the initial value of the engine speed Ne and the target value of the electric motor speed Nmg to be established upon completion of the shift-down action is comparatively large, so that an accordingly large amount of heat is generated by the engine connecting/disconnecting clutch K0 during the slipping action of the clutch K0. Further, the length of time required for completion of the engine starting control is comparatively long.

In the second control mode, only the engine starting control is initiated at the time t2, and an increase of the engine speed Ne is initiated as indicated by the two-dot chain line. On the other hand, the shift-down control of the automatic transmission 18 is delayed as indicated by the solid line, that is, the electric motor speed Nmg after the time t2 is kept at the value as of a moment at which the shift-down action is required. In the second control mode, the engine speed Ne is merely required to be increased to the value of the electric motor speed Nmg prior to initiation of the shift-down action, so that the difference between the initial value of the engine speed Ne and the electric motor speed Nmg is comparatively small, whereby the engine speed Ne is increased to the electric motor speed Nmg in a shorter length of time (ending at a time t3) relative to that in the first control mode, and the engine starting control is thus completed. After the completion of the engine starting control at the time t3, the shift-down control of the automatic transmission 18 is initiated at a time t4. At this time t4, the engine connecting/disconnecting clutch K0 has already been placed in the fully engaged state, so that no heat is generated by the clutch K0. At a time t6, the engine speed Ne and the electric motor speed Nmg reach the target value to be established upon completion of the shift-down action, and the shift-down action of the automatic transmission 18 is thus completed. In the second control mode in which the initiation of the shift-down action is delayed, the length of time (up to the time t6) required for completion of the engine starting control and the shift-down action is longer than in the first control mode (in which the shift-down action is completed at a time shortly after the time t5). However, the amount of increase of the engine speed Ne in the engine starting control to the target speed (equal to the value of the electric motor speed Nmg prior to initiation of the shift-down action) is comparatively small, so that an accordingly small amount of heat is generated by the clutch K0.

Referring back to FIG. 2, a switching control portion (switching control means) 108 is configured to select one of the first and second control modes, in which the engine starting control and the shift-down control of the automatic transmission 18 are implemented. The switching control portion 108 calculates the input shaft speed Nin to be established upon completion of the shift-down action. The switching control portion 108 selects the first control mode if the calculated input shaft speed Nin is lower than a predetermined threshold value Na, and selects the second control mode if the calculated input speed Nin is equal to or higher than the threshold value Na. Since the input shaft speed Nin to be established upon completion of the shift-down action is likely to exceed the predetermined threshold value Na with an increase of the input shaft speed Nin to be established upon completion of the shift-down action, the second control mode rather than the first control mode is more likely to be selected when the electric motor speed Nmg to be established upon completion of the shift-down action is relatively high. In the present embodiment in which the lock-up clutch 38 is placed in the engaged state in the first and second control modes, the electric motor speed Nmg and the speed Nin of the transmission input shaft 36 are equal to each other, so that the switching control portion 108 selects the first control mode if the electric motor speed Nmg to be established upon completion of the shift-down action is lower than the predetermined threshold value Na, and selects the second control mode if the electric motor speed Nmg to be established upon completion of the shift-down action is equal to or higher than the threshold value Na. Thus, the second control mode rather than the first control mode is more likely to be selected when the electric motor speed Nmg to be established upon completion of the shift-down action is relatively high.

Figure 4:
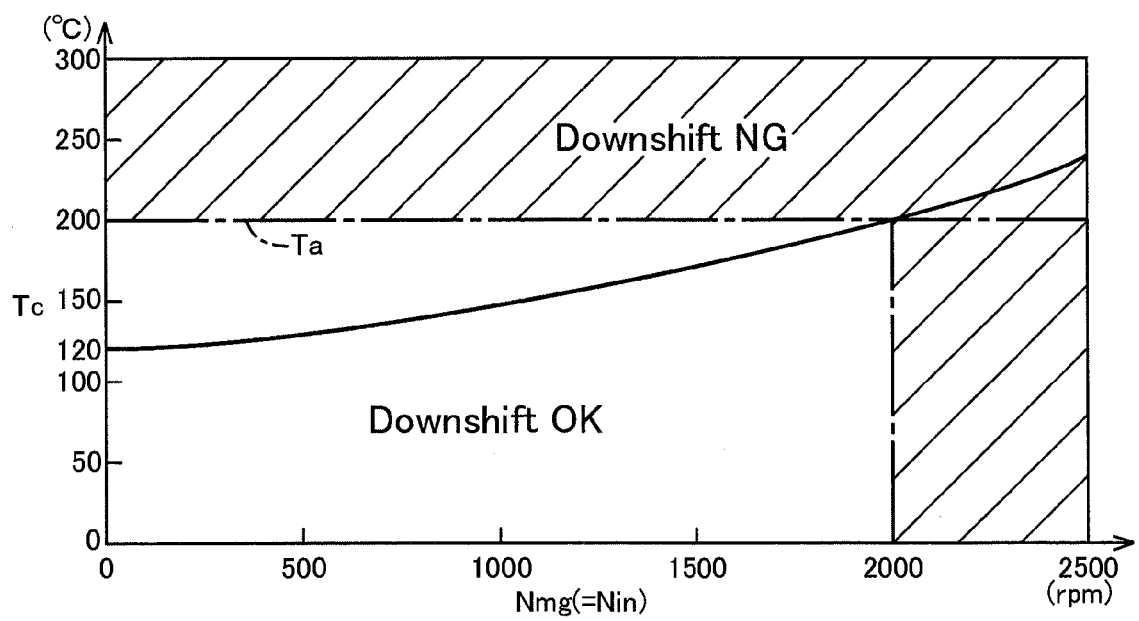
FIG. 4 graphically depicts a relationship between an operating speed of the electric motor to be established upon completion of the shift-down action of the automatic transmission, and a temperature of an engine connecting/disconnecting clutch, where the electric motor speed is used as a target value in the engine starting control.

FIG. 4 graphically depicts a relationship between the electric motor speed Nmg to be established upon completion of the shift-down action of the automatic transmission 18, and a calculated temperature Tc of the engine connecting/disconnecting clutch K0, where this electric motor speed Nmg is used as the target value in the engine starting control. In this example of FIG. 4, the clutch temperature Tc upon initiation of the engine starting control is about 120° C.

As indicated in FIG. 4, the clutch temperature Tc increases with an increase of the electric motor speed Nmg to be established upon completion of the shift-down action, in other words, with an increase of the target value to which the engine speed Ne is increased during the slipping action of the engine connecting/disconnecting clutch K0 in the engine starting control. Namely, the amount of heat generated by the engine connecting/disconnecting clutch K0 during its slipping action increases with an increase of the target value to which the engine speed Ne is increased during the slipping action.

As also indicated in FIG. 4, the clutch temperature Tc is increased to 200° C. where the electric motor speed Nmg to be established upon completion of the shift-down action is 2000 rpm. Where a permissible highest temperature value Ta of the clutch temperature Tc of the engine connecting/disconnecting clutch K0 is 200° C., as indicated by one-dot chain line, a highest value to which the engine speed Ne is permitted to be increased during the slipping action of the clutch K0 is 2000 rpm in the example of FIG. 4. Therefore the engine rotation speed Ne can be increased to a value less than 2000 rpm by the slipping control. That is, where the target value of the electric motor speed Nmg to be established upon completion of the shift-down action is equal to or higher than 2000 rpm, the clutch temperature Tc will exceed 200° C. if the engine starting control is implemented. Therefore, the shift-down control is inhibited in this case. For this reason, in the example of FIG. 4, the above-indicated threshold value Na of the electric motor speed Nmg to be established upon completion of the shift-down action is 2000 rpm. Namely, where the electric motor speed Nmg to be established upon completion of the shift-down action is lower than 2000 rpm, the clutch temperature Tc will not exceed the permissible highest temperature value Ta in the first control mode. In this case, the engine connecting/disconnecting clutch K0 will not be deteriorated due to the generated heat.

The switching control portion 108 calculates the electric motor speed Nmg to be established upon completion of the shift-down action, and determines whether the calculated electric motor speed Nmg is equal to or greater than the above-indicated threshold value Na. If the calculated electric motor speed Nmg to be established upon completion of the shift-down action is less than the threshold value Na, the switching control portion 108 determines that the clutch temperature Tc will not exceed the permissible highest temperature value Ta in the first control mode, and selects the first control mode. If the calculated electric motor speed Nmg is equal to or greater than the threshold value Na, on the other hand, the switching control portion 108 determines that the clutch temperature Tc will exceed the permissible highest temperature value Ta in the first control mode, and selects the second control mode. In this respect, it is noted that the electric motor speed Nmg to be established after the shift-down action is calculated on the basis of the vehicle running speed V (transmission output shaft speed Nout), and a speed ratio γ of the gear position to which the automatic transmission 18 is shifted down.

Figure 5:
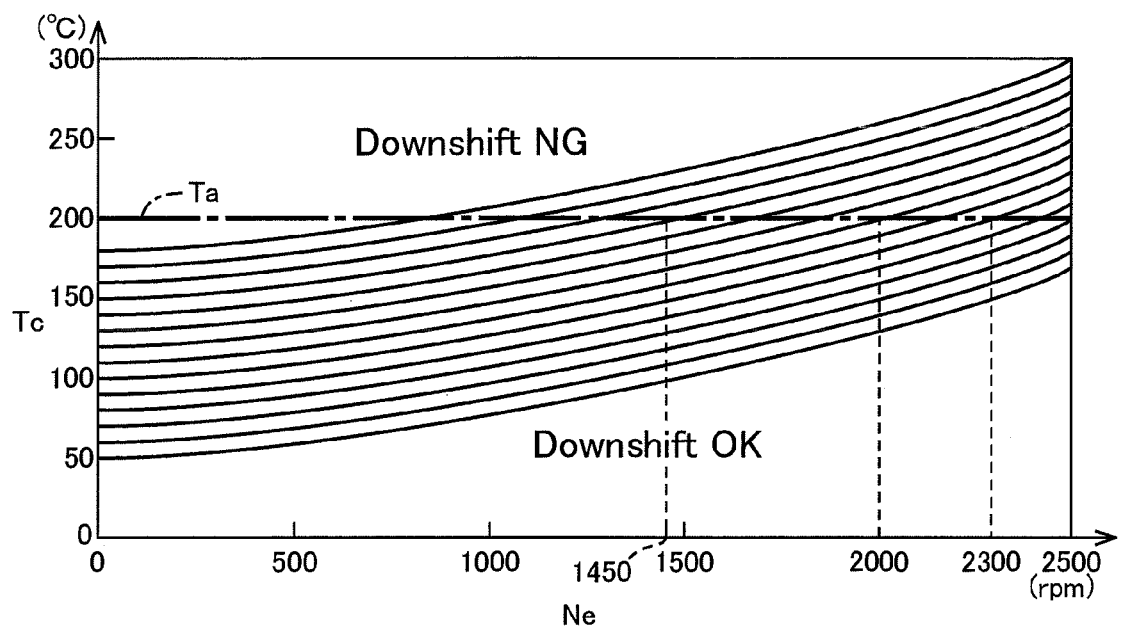
FIG. 5 graphically depicts changes of the clutch temperature from a plurality of initial values upon initiation of the engine starting control, during the engine starting control by a slipping action of the engine connecting/disconnecting clutch.

In the example of FIG. 4 in which the initial value of the clutch temperature Tc upon initiation of the engine starting control is 120° C., the threshold value Na is 2000 rpm. However, the threshold value Na changes depending upon the initial value of the clutch temperature Tc upon initiation of the engine starting control. FIG. 5 graphically depicts different relationships between the engine speed Ne and the clutch temperature Tc after the engine starting control, in the respective cases of a plurality of initial values upon initiation of the engine starting control.

The relationships indicated in FIG. 5 include the relationship of FIG. 4 where the initial value of the clutch temperature Tc upon initiation of the engine starting control is 120° C., wherein the clutch temperature Tc is increased to the permissible highest temperature value Ta of 200° C. when the engine speed Ne is increased to 2000 rpm. The relationships of FIG. 5 also includes the relationship where the initial value of the clutch temperature Tc upon initiation of the engine starting control is 100° C., wherein the clutch temperature Tc is increased to 200° C. when the engine speed Ne is increased to about 2300 rpm. The relationships of FIG. 5 further include the relationship where the initial value of the clutch temperature Tc upon initiation of the engine starting control is 150° C., wherein the clutch temperature Tc is increased to 200° C. when the engine speed Ne is increased to about 1450 rpm. Thus, the engine speed Ne at which the clutch temperature Tc reaches 200° C. after initiation of the engine starting control decreases with an increase of the initial value of the clutch temperature Tc upon initiation of the engine starting control. The values of the engine speed Ne at which the above-indicated clutch temperature Tc reaches 200° C. are set as the above-indicated threshold value Na. Accordingly, the threshold value Na is set so as to decrease with an increase of the initial value of the clutch temperature Tc upon initiation of the engine starting control. Where the threshold value Na is set to be relatively low, the electric motor speed Nmg to be established upon completion of the shift-down action is likely to exceed the threshold value Na, so that the second control mode rather than the first control mode is more likely to be selected. Namely, the second control mode rather than the first control mode is more likely to be selected when the initial value of the clutch temperature Tc upon initiation of the engine starting control is relatively high.

The switching control portion 108 detects the clutch temperature Tc upon initiation of the engine starting control, and updates the threshold value Na according to the detected clutch temperature Tc. For example, the switching control portion 108 calculates the temperature Tc of the engine connecting/disconnecting clutch K0 on the basis of the temperature THoil of the working oil which influences the clutch temperature Tc. Described more specifically, the switching control portion 108 calculates the clutch temperature Tc, on the basis of the actual value of the working oil temperature THoil, and according to a predetermined relationship between the clutch temperature Tc and the working oil temperature THoil, which relationship was obtained by experimentation. Alternatively, the switching control portion 108 calculates the clutch temperature Tc according to an experimental formula.

Figure 6:
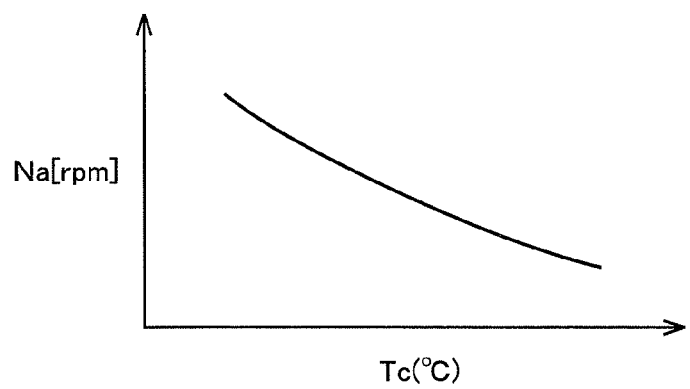
FIG. 6 is a map representing a relationship between the clutch temperature and a threshold input shaft speed of the automatic transmission.

The switching control portion 108 determines the threshold value Na on the basis of the obtained clutch temperature Tc, and according to a predetermined relationship stored in memory between the clutch temperature Tc and the threshold value Na. FIG. 6 is an example of a map representing the relationship between the clutch temperature Tc and the threshold value Na. This map of FIG. 6 is obtained by plotting values of the engine speed Ne (represented by respective points of intersection between a one-dot chain line and solid lines in FIG. 5) to which the clutch temperature Tc is increased from the respective initial values upon initiation of the engine starting control to the permissible highest temperature value Ta (=200° C.) indicated by a one-dot chain line in FIG. 5 after initiation of the engine starting control. As is apparent from FIG. 6, the threshold value Na decreases with an increase of the clutch temperature Tc upon initiation of the engine starting control. The switching control portion 108 determines the threshold value Na on the basis of the obtained clutch temperature Tc and according to the map of FIG. 6, and selects the first control mode if the electric motor speed Nmg to be established after completion of the shift-down action is lower than the determined threshold value Na, and the second control mode if the electric motor speed Nmg is equal to or higher than the threshold value Na. According to this selection, the clutch temperature Tc will not exceed the permissible highest temperature value Ta even if the first control mode is selected, and the response of the vehicle to the vehicle operator's desire for high drivability of the vehicle will be improved. The second control mode is selected only where the clutch temperature Tc after initiation of the engine starting control would exceed the permissible highest temperature value Ta in the first control mode, so that the deterioration of the engine connecting/disconnecting clutch K0 due to a rise of its temperature is prevented.

FIG. 7 is a flow chart of a major control operation of the electronic control device 100. More specifically, FIG. 7 is a flow chart of a control operation to implement the engine starting control and the shift-down control of the automatic transmission 18. This control operation is repeatedly performed with an extremely short cycle time of several milliseconds to several tens of milliseconds, for example. The control routine of the flow chart of FIG. 7 is based on an assumption that the engine starting control has been initiated prior to initiation of the control routine. However, the control routine of the flow chart of FIG. 7 may apply to the case in which the engine starting control and the shift-down control are concurrently or substantially concurrently initiated.

The control routine is initiated with step S1 (corresponding to the step-variable shifting control portion 102) to determine whether a shift-down action of the automatic transmission 18 is required. If a negative determination is obtained in step S1 (hereinafter "step" being omitted), only the engine starting control is implemented, and one cycle of execution of the present control routine is terminated. If an affirmative determination is obtained in S1, the control flow goes to S2 (corresponding to the switching control portion 108) to detect the present value of the clutch temperature Tc, calculate the threshold value Na on the basis of the detected clutch temperature Tc, and determine whether the electric motor speed Nmg to be established upon completion of the shift-down action is equal to or greater than the threshold value Na. If a negative determination is obtained in S2, it is determined that it is permissible to select the first control mode. In this case, therefore, the control flow goes to S6 (corresponding to the step-variable shifting control portion 102) to implement the shift-down control concurrently with the engine starting control, so that the response of the vehicle to the vehicle operator's desire for high drivability of the vehicle is improved. If an affirmative determination is obtained in S2, it is determined that it is not permissible to select the first control mode. In this case, therefore, the second control mode is selected. Namely, the control flow goes to S3 (corresponding to the step-variable shifting control portion 102) to delay the shift-down action of the automatic transmission 18. Then, the control flow goes to S4 (corresponding to the engine starting control portion 106) to determine whether the engine starting control is completed. For instance, this determination is made by determining whether the difference between the engine speed Ne and the electric motor speed Nmg is less than a threshold value or not, or whether the torque capacity of the engine connecting/disconnecting clutch K0 has increased to a predetermined value or not. If a negative determination is obtained in S4, the control flow goes back to S3, to continue delaying of the shift-down action. If an affirmative determination is obtained in S4, it is determined that the engine starting control is completed, namely, the engine connecting/disconnecting clutch K0 has been brought into its fully engaged state. In this case, the control flow goes to S5 (corresponding to the shifting control portion 102) to initiate the shift-down action which has been delayed. Accordingly, the deterioration of the engine connecting/disconnecting clutch K0 due to overheating is prevented, although the vehicle response to the operator's desire for high vehicle drivability is low relative to a case of the first control mode.

The present embodiment described above is configured such that the second control mode in which the amount of heat generated by the slipping action of the clutch K0 is reduced is more likely to be selected when the temperature Tc of the engine connecting/disconnecting clutch K0 is relatively high, so that the deterioration of the engine connecting/disconnecting clutch K0 due to the generated heat is prevented. When the clutch temperature Tc is relatively low, on the other hand, the first control mode is more likely to be selected, so that the response of the vehicle to the operator's desire for high drivability of the vehicle is improved. In the first control mode, the amount of heat generated by the engine connecting/disconnecting clutch K0 is relatively large, but the clutch temperature Tc which is relatively low will not exceed its permissible highest temperature value Ta. Thus, the control mode is switched between the first control mode and the second control mode, according to the clutch temperature Tc, permitting not only the prevention of deterioration of the engine connecting/disconnecting clutch K0 due to the generated heat, but also the improvement of the vehicle response to the operator's desire for high vehicle drivability.

The present embodiment is further configured such that the second control mode is more likely to be selected than the first control mode when the electric motor speed Nmg to be established upon completion of the shift-down action of the automatic transmission 18 is relatively high. The amount of heat generated by the slipping action of the engine connecting/disconnecting clutch K0 during starting of the engine increases with an increase of the electric motor speed Nmg. Accordingly, the amount of heat generated by the engine connecting/disconnecting clutch K0 is further effectively reduced by selecting the second control mode when the electric motor speed Nmg is relatively high, so that the deterioration of the engine connecting/disconnecting clutch K0 due to the generated heat is prevented.

The present embodiment is also configured to select the second control mode when the input speed Nin of the automatic transmission 18 (namely, the electric motor speed Nmg) to be established upon completion of the shift-down action is equal to or greater than the predetermined threshold value Na, and to select the first control mode when the input speed Nin is less than the predetermined threshold value Na. Thus, one of the first control mode and the second control mode is selected according to the calculated input speed Nin to be established upon completion of the shift-down action. The second control mode is more likely to be selected when the input speed Nin is relatively high, since the input speed Nin is likely to exceed the threshold value Na.

The present embodiment is further configured such that the threshold value Na is set so as to decrease with an increase of the temperature Tc of the engine connecting/disconnecting clutch K0 upon initiation of the engine starting control. Accordingly, the second control mode is more likely to be selected when the clutch temperature Tc is relatively high, since the threshold value Na decreases with the increase of the clutch temperature Tc.

Other embodiments of the control apparatus and system will now be described. In the following description, the same reference signs will be used to identify the same or similar elements described in the preceding embodiment.

Second Embodiment

In the preceding embodiment, the threshold value Na is changed on the basis of the clutch temperature Tc upon initiation of the engine starting control, so that the second control mode rather than the first control mode is more likely to be selected when the clutch temperature Tc is relatively high. However, one of the first control mode and the second control mode may be selected by estimating the clutch temperature Tc as of the time when the engine speed Ne has been increased to the electric motor speed Nmg to be established upon completion of the shift-down action.

When the engine starting control is required, the switching control portion 108 in the present embodiment estimates the temperature Tc of the engine connecting/disconnecting clutch K0 as of the time when the engine speed Ne has been increased to the electric motor speed Nmg to be established upon completion of the shift-down action by slipping control of the clutch K0, namely, the switching control portion 108 estimates the clutch temperature Tc if the first control mode is selected. For instance, the switching control portion 108 stores therein a map as indicated in FIG. 8, which map represents different amounts of rise ΔT of the clutch temperature Tc corresponding to respective combinations of the kind of shift-down action of the automatic transmission 18 and the vehicle running speed V. The switching control portion 108 determines the amount of rise ΔT of the clutch temperature Tc, on the basis of the present kind of the shift-down action and the present vehicle running speed V, and according to the map. Further, the switching control portion 108 estimates the clutch temperature Tc upon completion of the engine starting control, by adding the determined amount of rise ΔT to the present value of the clutch temperature Tc. Then, the switching control portion 108 determines whether the estimated clutch temperature Tc is greater than the predetermined permissible highest temperature value Ta (upper limit) of the engine connecting/disconnecting clutch K0, and selects the second control mode if the estimated clutch temperature Tc is greater than the permissible highest temperature value Ta, or selects the first control mode if the estimated clutch temperature Tc is less than the permissible highest temperature value Ta. It is noted that the map of the amounts of temperature rise ΔT indicated in FIG. 8 is obtained by experimentation and stored in a memory. It is also noted that the permissible highest temperature value Ta is determined such that the deterioration of the engine connecting/disconnecting clutch K0 can be prevented below the permissible highest temperature value Ta (for example, 200° C.).

Thus, the clutch temperature Tc as of the time when the engine speed Ne has been increased to the electric motor speed Nmg to be established upon completion of the shift-down action is calculated (estimated), and the second control mode is selected if the calculated clutch temperature Tc is greater than the permissible highest temperature value Ta, while the first control mode is selected if the calculated clutch temperature Tc is not greater than the permissible highest temperature value Ta. Namely, the second control mode rather than the first control mode is more likely to be selected when the clutch temperature Tc estimated if the first control mode is selected is relatively high. Since the second control mode is selected if the calculated clutch temperature Tc is greater than the permissible highest temperature value Ta, the amount of heat generated by the engine connecting/disconnecting clutch K0 during the engine starting control is reduced, so that the deterioration of the engine connecting/disconnecting clutch K0 due to the generated heat is prevented. If the calculated clutch temperature Tc is not greater than the permissible highest temperature value Ta, the first control mode is selected so that response of the vehicle to the operator's desire for high vehicle drivability can be improved without the clutch temperature Tc exceeding the permissible highest temperature value Ta.

FIG. 9 is a flow chart depicting a major control operation of the electronic control device 100 according to another embodiment. More specifically, FIG. 9 is a flow chart depicting a control operation to implement the engine starting control and the shift-down control of the automatic transmission 18.

The control routine of FIG. 9 is initiated with step S1 (corresponding to the step-variable shifting control portion 102) to determine whether a shift-down action of the automatic transmission 18 is required. If a negative determination is obtained in step S1 (hereinafter "step" being omitted), only the engine starting control is implemented, and one cycle of execution of the present control routine is terminated. If an affirmative determination is obtained in S1, the control flow goes to S2 (corresponding to the switching control portion 108) to calculate (estimate) the clutch temperature Tc as of the time when the engine speed Ne has been increased to the electric motor speed Nmg to be established upon completion of the shift-down action, and determining whether the calculated clutch temperature Tc is equal to or greater than the predetermined permissible highest temperature value Ta. If a negative determination is obtained in S2, it is determined that it is permissible to select the first control mode. In this case, therefore, the control flow goes to S6 (corresponding to the step-variable shifting control portion 102) to implement the shift-down control concurrently with the engine starting control, so that the response of the vehicle to the vehicle operator's desire for high drivability of the vehicle is improved. If an affirmative determination is obtained in S2, it is determined that it is not permissible to select the first control mode. In this case, therefore, the second control mode is selected. Namely, the control flow goes to S3 (corresponding to the step-variable shifting control portion 102) to delay the shift-down action of the automatic transmission 18. Then, the control flow goes to S4 (corresponding to the engine starting control portion 106) to determine whether the engine starting control is completed. If a negative determination is obtained in S4, the control flow goes back to S3, to continue the delay of the shift-down action. If an affirmative determination is obtained in S4, it is determined that the engine starting control is completed, namely, the engine connecting/disconnecting clutch K0 has been brought into its fully engaged state. In this case, the control flow goes to S5 (corresponding to the shifting control portion 102) to initiate the shift-down action which has been delayed. Accordingly, the deterioration of the engine connecting/disconnecting clutch K0 due to overheating is better mitigated in the second control mode relative to the first control mode, although the vehicle response to the operator's desire for high vehicle drivability is comparatively low.

As described above, the present embodiment is configured to calculate (estimate) the temperature Tc of the engine connecting/disconnecting clutch K0 as of the time when the engine speed Ne has been increased to the electric motor speed Nmg to be established upon completion of the shift-down action, and to select one of the first control mode and the second control mode on the basis of the calculated clutch temperature Tc. In this respect, the present embodiment provides the same advantages as the preceding embodiment.

Third Embodiment

In the preceding embodiments, the second control mode rather than the first control mode is more likely to be selected to change the vehicle drive mode from the motor drive mode to the engine drive mode, when the temperature Tc of the engine connecting/disconnecting clutch K0 upon initiation of the engine starting control is relatively high than when it is relatively low. Described more specifically, the preceding embodiments are configured to select the second control mode when the clutch temperature Tc upon initiation of the engine starting control is relatively high, so that the shift-down control is implemented after completion of the engine starting control, whereby the amount of slipping of the engine connecting/disconnecting clutch K0 is reduced to minimize the amount of generation of heat by the clutch K0. On the other hand, the present embodiment is configured to delay the time of initiation of the shift-down action of the automatic transmission 18 by a longer length of time when the temperature Tc of the engine connecting/disconnecting clutch K0 at the time of initiation of the engine is relatively high than when it is relatively low. Described more specifically, the present embodiment is configured not to necessarily delay the initiation of the shift-down action until the engine starting control is completed as in the preceding embodiments, but to initiate the shift-down action during the engine starting control.

Figure 10:
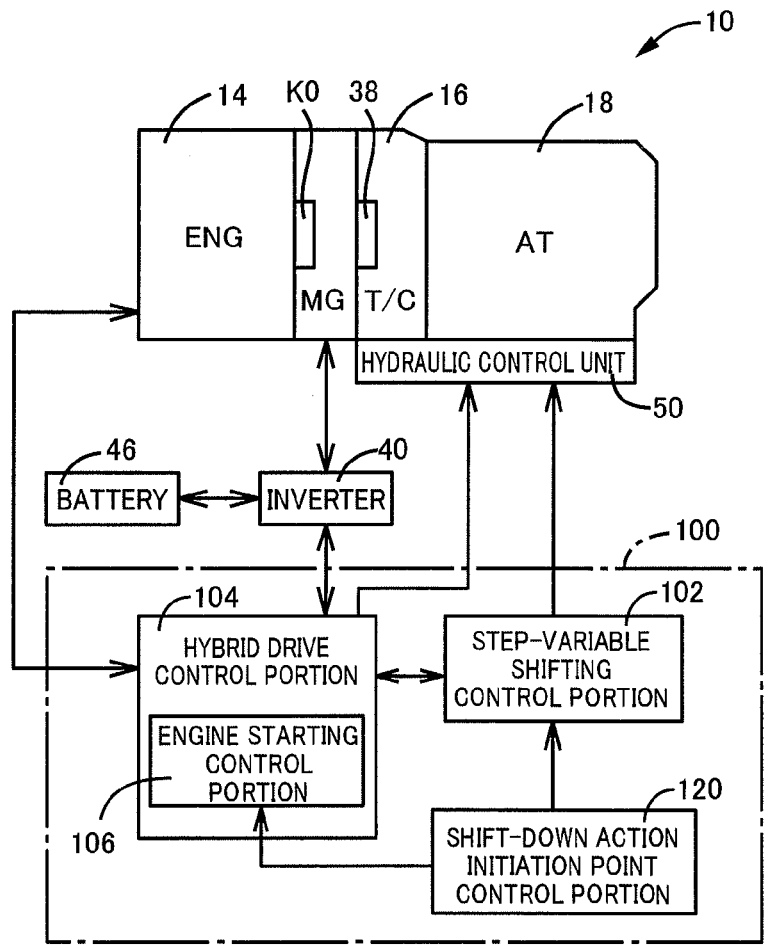
FIG. 10 is a functional block diagram of an electronic control device according to a further embodiment described herein.

FIG. 10 is a functional block diagram depicting major control functions of the electronic control device 100 according to the present embodiment. The electronic control device 100 of FIG. 10 is different from that of FIG. 2 only in that the electronic control device 100 of FIG. 10 is provided with a shift-down action initiation point control portion 120 (shift-down action initiation point control means). The shift-down action initiation point control portion 120 will be described in further detail herein.

When the automatic transmission 18 is required to be shifted down (i.e., a shift-down action is initiated) while the vehicle drive mode is switched from the motor drive mode to the engine drive mode, the shift-down action initiation point control portion 120 detects the temperature Tc of the clutch upon initiation of the engine starting control, and delays the time of initiation of the shift-down action of the automatic transmission 18 by a longer length of time when the detected clutch temperature Tc is relatively high than when it is relatively low. The delayed initiation of the shift-down action of the automatic transmission 18 results in a delayed entry of the automatic transmission 18 into the inertia phase, namely, a delayed increase of the input speed Nin of the automatic transmission 18. The delayed increase of the input speed Nin of the automatic transmission 18 permits synchronization of the engine speed Ne with the input speed Nin (that is, the electric motor speed Nmg), namely, completion of the engine starting control with the engine connecting/disconnecting clutch K0 placed in the fully engaged state, when the engine speed Ne is relatively low. Accordingly, it is possible to reduce the amount of slipping of the engine connecting/disconnecting clutch K0 during the engine starting control, and consequently reduce the amount of heat generated by the engine connecting/disconnecting clutch K0.

Figure 11:
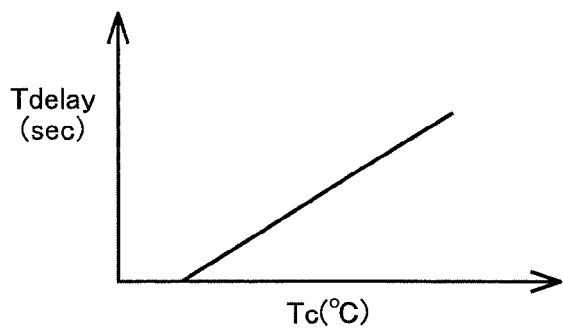
FIG. 11 is a map representing a relationship between the clutch temperature upon initiation of the engine starting control, and a delay time from a time at which a requirement for the shift-down action of the automatic transmission is determined to a time at which the shift-down action is actually initiated.

The shift-down action initiation point control portion 120 stores therein a map representing a relationship between the clutch temperature Tc upon initiation of the engine starting control and a delay time Tdelay from a time at which the requirement for the shift-down action of the automatic transmission 18 is determined to a time at which the shift-down action is actually initiated. An example of this map is shown in FIG. 11. The shift-down action initiation point control portion 120 determines the delay time Tdelay on the basis of the clutch temperature Tc and according to the above-indicated relationship, and commands the automatic transmission 18 to initiate the shift-down action when the determined delay time Tdelay has passed after the time at which the requirement for the shift-down action was determined. As is apparent from FIG. 11, the delay time Tdelay is set so as to increase with an increase of the clutch temperature Tc upon initiation of the engine starting control. Namely, the length of time by which the initiation of the shift-down action is delayed increases with an increase of the clutch temperature Tc. Accordingly, the engine speed Ne which has been increased during the engine starting control synchronizes with the input speed Nin when the engine speed Ne is lower than the input speed Nin upon initiation or completion of the shift-down action, so that the amount of slipping of the engine connecting/disconnecting clutch K0 during the engine starting control is reduced, whereby the amount of heat generated by the clutch K0 is reduced. It is noted that the above-indicated relationship is obtained by experimentation so that the temperature of the engine connecting/disconnecting clutch K0 in the engine starting control will not exceed the predetermined permissible highest temperature value Ta.

The present embodiment described above is configured such that when the automatic transmission 18 is required to be shifted down while the hybrid vehicle is switched from the motor drive mode to the engine drive mode, the length of time by which the time of initiation of the shift-down action of the automatic transmission 18 is delayed increases with an increase of the temperature Tc of the engine connecting/disconnecting clutch K0 upon initiation of the engine starting control. Accordingly, it is possible to complete the engine starting control with the engine connecting/disconnecting clutch K0 placed in the fully engaged state, when the engine speed Ne is relatively low, so that the amount of slipping of the clutch K0 during the engine starting control is reduced, whereby the deterioration of the engine connecting/disconnecting clutch K0 due to the generated heat can be prevented. Further, the shift-down action is initiated with a relatively short delay time when the clutch temperature Tc upon initiation of the engine starting control is relatively low, so that the response of the hybrid vehicle to the operator's desire for high vehicle drivability can be improved.

Fourth Embodiment

The engine starting control portion 106 according to the present embodiment controls an engaging torque Tk of the engine connecting/disconnecting clutch K0 such that the engaging torque Tk is relatively large when the clutch temperature Tc upon initiation of the engine starting control is relatively high than when it is relatively low. An increase of the engaging torque Tk of the engine connecting/disconnecting clutch K0 results in an increase of a rate of rise of the engine speed Ne, so that the engine speed Ne is rapidly increased to the electric motor speed Nmg (input speed Nin), whereby the engine speed Ne and the electric motor speed Nmg (input speed Nin) synchronize with each other when these speeds Ne and Nmg are relatively low. Accordingly, the amount of slipping of the engine connecting/disconnecting clutch K0 during the engine starting control is reduced, so that the amount of heat generated by the engine connecting/disconnecting clutch K0 is reduced.

Figure 12:
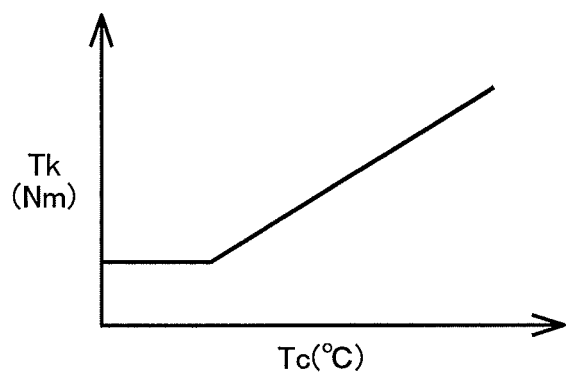
FIG. 12 is a map representing a relationship between the clutch temperature upon initiation of the engine starting control, and an engaging torque of the clutch.

In this embodiment, the engine starting control portion 106 stores therein a map representing a relationship between the clutch temperature Tc upon initiation of the engine starting control and the engaging torque Tk of the engine connecting/disconnecting clutch K0. An example of this map is graphically depicted in FIG. 12. The engine starting control portion 106 determines the engaging torque Tk on the basis of the clutch temperature Tc and according to the above-indicated relationship, and commands the engine connecting/disconnecting clutch K0 to be placed in an engaged state with the determined engaging torque Tk. As is apparent from FIG. 12, the engaging torque Tk of the engine connecting/disconnecting clutch K0 is determined so as to increase with an increase of the clutch temperature Tc. Accordingly, the engaging torque Tk of the engine connecting/disconnecting clutch K0 increases with an increase of the clutch temperature Tc, so that the rate of rise of the engine speed Ne increases with the increase of the clutch temperature Tc, whereby the engine speed Ne has been increased to the electric motor speed Nmg (input speed Nin) when the engine speed Ne is relatively low. Accordingly, the amount of slipping of the engine connecting/disconnecting clutch K0 during the engine starting control is reduced, whereby the amount of heat generated by the clutch K0 is reduced. It is noted that the above-indicated relationship is obtained by experimentation so that the temperature of the engine connecting/disconnecting clutch K0 in the engine starting control will not exceed the predetermined permissible highest temperature value Ta.

The control apparatus of the present embodiment is configured such that the engaging torque Tk of the engine connecting/disconnecting clutch K0 increases with an increase of the temperature Tc of the engine connecting/disconnecting clutch K0 upon initiation of the engine starting control, so that the rate of rise of the engine speed Ne increases with the increase of the clutch temperature Tc. Accordingly, it is possible to complete the engine starting control with the engine connecting/disconnecting clutch K0 placed in the fully engaged state, when the engine speed Ne is relatively low, so that the amount of slipping of the clutch K0 during the engine starting control is reduced, whereby the deterioration of the engine connecting/disconnecting clutch K0 due to the generated heat can be prevented. Further, the engaging torque Tk of the engine connecting/disconnecting clutch K0 is relatively small when the clutch temperature Tc is relatively low, so that an engaging shock of the clutch K0 during the engine starting control is reduced, and the response of the hybrid vehicle to the operator's desire for high vehicle drivability can be improved.

While the embodiments of the control apparatuses and systems have been described in detail by reference to the drawings, it is to be understood that the control apparatuses, systems, and methods may be otherwise embodied without departing from the spirit and the scope of the claimed subject matter.

For example, two or more of the illustrated embodiments which have been described as mutually independent embodiments may be suitably combined as a single embodiment.

In the illustrated embodiments, the shift-down action initiation point control portion 120 is configured to set the delay time Tdelay from the time of the determination of the requirement for the shift-down action to the time of actual generation of the command to implement the shift-down action, to delay the initiation of the shift-down action. However, the shift-down action initiation point control portion 120 may be configured to increase an initial stand-by hydraulic pressure of a clutch which is to be brought into its released state to implement the shift-down action. An increase of the initial stand-by hydraulic pressure of the above-indicated clutch causes a delayed entry into the inertia phase of the shift-down action, which makes it possible to permit the engine speed Ne to synchronize with the electric motor speed Nmg (input speed Nin) when the engine speed Ne is relatively low, so that the amount of slipping of the engine connecting/disconnecting clutch during the engine starting control is reduced, whereby the amount of heat generated by the engine connecting/disconnecting clutch K0 can be reduced.

In the illustrated embodiments, the clutch temperature Tc need not be calculated on the basis of the temperature THoil of the working oil. The clutch temperature Tc may be obtained by any other method. For instance, the clutch temperature Tc may be detected directly by a dedicated temperature sensor. Alternately, the clutch temperature Tc may be calculated according to a formula obtained by experimentation.

While the control operations in the illustrated embodiments have been described on an assumption that the lock-up clutch 38 is placed in the engaged state, it should be understood that the control operations described herein may be performed with the lock-up clutch 38 in a released state.

In the illustrated embodiments, the clutch temperature Tc upon completion of the engine starting control is calculated according to the map which is shown in FIG. 8 by way of example only. It should be understood that this map may be suitably modified to an extent that permits calculation (estimation) of the clutch temperature Tc upon completion of the engine starting control. Further, the clutch temperature Tc upon completion of the engine starting control need not be obtained according to a map, but may be calculated (estimated) according to a formula obtained by experimentation.

Various specific numerical values described with respect to the illustrated embodiments are given by way of example only, and may be suitably changed as needed depending upon the particular type of vehicle.

It is to be understood that the embodiments and their modifications have been described above for illustrative purpose only, and that the control apparatuses, systems and methods described herein may be embodied with various other changes and improvements without departing from the spirit and the scope of the subject matter described herein.

NOMENCLATURE OF REFERENCE SIGNS

10: Hybrid vehicle (Vehicle)
14: Engine
18: Automatic transmission (Transmission)
100: Electronic control device (Control apparatus)
MG: Electric motor
K0: Engine connecting/disconnecting clutch (Clutch)
Tc: Clutch temperature

The invention claimed is:

1. A control apparatus for a hybrid vehicle provided with an engine, an electric motor, a clutch for placing a power transmitting path between said engine and said electric motor in a power transmitting state and a power cutoff state, and a transmission disposed in a power transmitting path between said electric motor and drive wheels, the hybrid vehicle being switchable between a motor drive mode in which the hybrid vehicle is driven with said electric motor being used as a vehicle drive power source while said clutch is placed in a released state, and an engine drive mode in which the hybrid vehicle is driven with said engine being used as a main vehicle drive power source while said clutch is placed in an engaged state, and an operating speed of said engine being raised by said electric motor in a slipping state of said clutch when the hybrid vehicle is switched from said motor drive mode to said engine drive mode, wherein:

said control apparatus comprises a processor and a memory storing a computer readable and executable instruction set, such that, when said transmission is selected to undergo a shift-down control to shift down said transmission while said hybrid vehicle is switched from said motor drive mode to said engine drive mode, said processor executes said computer readable and executable instruction set to:

determine a temperature of said clutch upon initiation of an engine starting control;

select, based on said temperature of said clutch, one of a first control mode in which said engine starting control to start the engine upon switching of said hybrid vehicle from said motor drive mode to said engine drive mode is implemented concurrently with said shift-down control or a second control mode in which said shift-down control is implemented after completion of said engine starting control; and operating said hybrid vehicle in said selected one of said first control mode or said second control mode.

2. The control apparatus according to claim 1, wherein said processor further executes said computer readable and executable instruction set to:

determine an input speed of said transmission to be established upon completion of said shift-down control;

compare said input speed of said transmission to a predetermined threshold value;

select said second control mode when said input speed of said transmission is equal to or higher than said predetermined threshold value; and select said first control mode when said input speed of said transmission is lower than said predetermined threshold value.

3. The control apparatus according to claim 2, wherein said predetermined threshold value decreases with an increase of said temperature of said clutch upon initiation of said engine starting control.

4. The control apparatus according to claim 1, wherein said temperature of said clutch is calculated based on of a temperature of a working oil.

5. The control apparatus according to claim 1, wherein said transmission is a step-variable automatic transmission.

* * * * *

UNITED STATES PATENT AND TRADEMARK OFFICE
CERTIFICATE OF CORRECTION

PATENT NO. : 9,180,876 B2  
APPLICATION NO. : 14/172062  
DATED : November 10, 2015  
INVENTOR(S) : Takahiko Tsutsumi et al.

Page 1 of 1

It is certified that error appears in the above-identified patent and that said Letters Patent is hereby corrected as shown below:

On the title page

Item 58 (Field of classification search), delete "Y01T 10/62" and insert --Y02T 10/62--, therefor.

Item 58 (Field of classification search), delete "Y01T 10/6213" and insert --Y02T 10/6213--, therefor.

Item 58 (Field of classification search), delete "Y01T 10/6221" and insert --Y02T 10/6221--, therefor.

Item 58 (Field of classification search), delete "Y01T 10/6226" and insert --Y02T 10/6226--, therefor.

Item 58 (Field of classification search), delete "Y01T 10/6286" and insert --Y02T 10/6286--, therefor.

Signed and Sealed this
Eighth Day of March, 2016

Michelle K. Lee
*Director of the United States Patent and Trademark Office*